US011951635B1

United States Patent
Oridate et al.

(10) Patent No.: US 11,951,635 B1
(45) Date of Patent: Apr. 9, 2024

(54) AUTOMATICALLY IDENTIFYING LOCATIONS TO APPLY SEALANT AND APPLYING SEALANT TO A TARGET OBJECT

(71) Applicant: Wilder Systems Inc., Austin, TX (US)

(72) Inventors: Ademola Ayodeji Oridate, Austin, TX (US); William Wilder, Austin, TX (US); Nicole Magpantay, Austin, TX (US); Daniel Moran, Austin, TX (US)

(73) Assignee: WILDER SYSTEMS INC, Austin, TX (US)

( * ) Notice: Subject to any disclaimer, the term of this patent is extended or adjusted under 35 U.S.C. 154(b) by 0 days.

(21) Appl. No.: 18/478,881

(22) Filed: Sep. 29, 2023

Related U.S. Application Data

(60) Provisional application No. 63/482,502, filed on Jan. 31, 2023, provisional application No. 63/378,463, filed on Oct. 5, 2022.

(51) Int. Cl.
*B25J 9/16* (2006.01)
*B25J 15/00* (2006.01)

(52) U.S. Cl.
CPC ........... *B25J 9/1679* (2013.01); *B25J 9/1664* (2013.01); *B25J 9/1697* (2013.01); *B25J 15/0019* (2013.01)

(58) Field of Classification Search
CPC .. B25J 15/0066; B25J 15/009; B25J 15/0019; B25J 9/1697; B25J 9/1664; B25J 9/1679; B25J 9/1653; B25J 9/1669; B25J 9/1684; G01B 11/02; G01B 11/04; G01B 11/046; G01B 11/22
See application file for complete search history.

(56) References Cited

U.S. PATENT DOCUMENTS

| | | | | |
|---|---|---|---|---|
| 5,396,160 A | * | 3/1995 | Chen | B25J 9/1664 700/182 |
| 6,836,702 B1 | * | 12/2004 | Brog | B23K 26/0884 700/262 |

(Continued)

FOREIGN PATENT DOCUMENTS

CN 109537422 A 3/2019

OTHER PUBLICATIONS

Laurent, et al., "Automated Detection of Sealed Cracks Using 2D and 3D Road Surface Data", Available Online at: https://www.pavemetrics.com/wp-content/uploads/2016/04/LCMS_Sealed_cracks.pdf, 2016, 12 pages.

*Primary Examiner* — Nicholas Kiswanto
(74) *Attorney, Agent, or Firm* — Kilpatrick Townsend & Stockton LLP

(57) ABSTRACT

Aspects of the disclosure are directed towards generating a trajectory for use by a robot to perform an operation on a target object. A method includes a robot instructed to traverse a surface of the target object from the starting position and obtain sensor input from a sensor system of the robot using a first trajectory specified by a CAD file for the target object. Sensor input that includes a first height to the target object, a width of the seam, and a depth of the seam may be received. A second trajectory may be generated for traversing the surface of the target object and that modifies the first trajectory based on the sensor input. The robot may be instructed to move to the starting position and traverse the surface of the target object using the second trajectory and apply a sealant to the seam.

20 Claims, 7 Drawing Sheets

(56) References Cited

U.S. PATENT DOCUMENTS

| | | | |
|---|---|---|---|
| 9,855,658 B2 * | 1/2018 | Babu | B25J 9/1694 |
| 2010/0250011 A1 | 9/2010 | Burkus, II et al. | |
| 2012/0043009 A1 | 2/2012 | Niermann et al. | |
| 2013/0020410 A1 | 1/2013 | Conrad | |
| 2017/0209950 A1 * | 7/2017 | Nishimura | B23K 9/0203 |
| 2018/0009000 A1 | 1/2018 | Shang et al. | |
| 2020/0009602 A1 | 1/2020 | Taniike et al. | |
| 2020/0016619 A1 * | 1/2020 | Raman | B25J 11/0075 |
| 2020/0078945 A1 | 3/2020 | Sun et al. | |
| 2022/0063099 A1 * | 3/2022 | Lin | B25J 9/1666 |
| 2022/0388160 A1 * | 12/2022 | Yonemoto | B23Q 15/00 |
| 2022/0395985 A1 * | 12/2022 | Maeda | G06F 3/14 |
| 2023/0041258 A1 * | 2/2023 | Okizaki | B23K 9/1087 |
| 2023/0173674 A1 * | 6/2023 | Lin | B25J 9/1666 |
| | | | 700/245 |
| 2023/0330856 A1 * | 10/2023 | Yoneyama | B25J 9/1664 |

* cited by examiner

AUTOMATICALLY IDENTIFYING LOCATIONS TO APPLY SEALANT AND APPLYING SEALANT TO A TARGET OBJECT

CROSS-REFERENCES TO RELATED APPLICATIONS

This application claims the benefit of prior filed U.S. Provisional Patent Application No. 63/378,463 filed Oct. 5, 2022, and U.S. Provisional Patent Application No. 63/482,502 filed Jan. 31, 2023, which is hereby incorporated by reference herein in its entirety.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of the enterprise's workers.

BRIEF DESCRIPTION OF THE DRAWINGS

Various embodiments in accordance with the present disclosure will be described with reference to the drawings in which.

DETAILED DESCRIPTION

Figure 1:
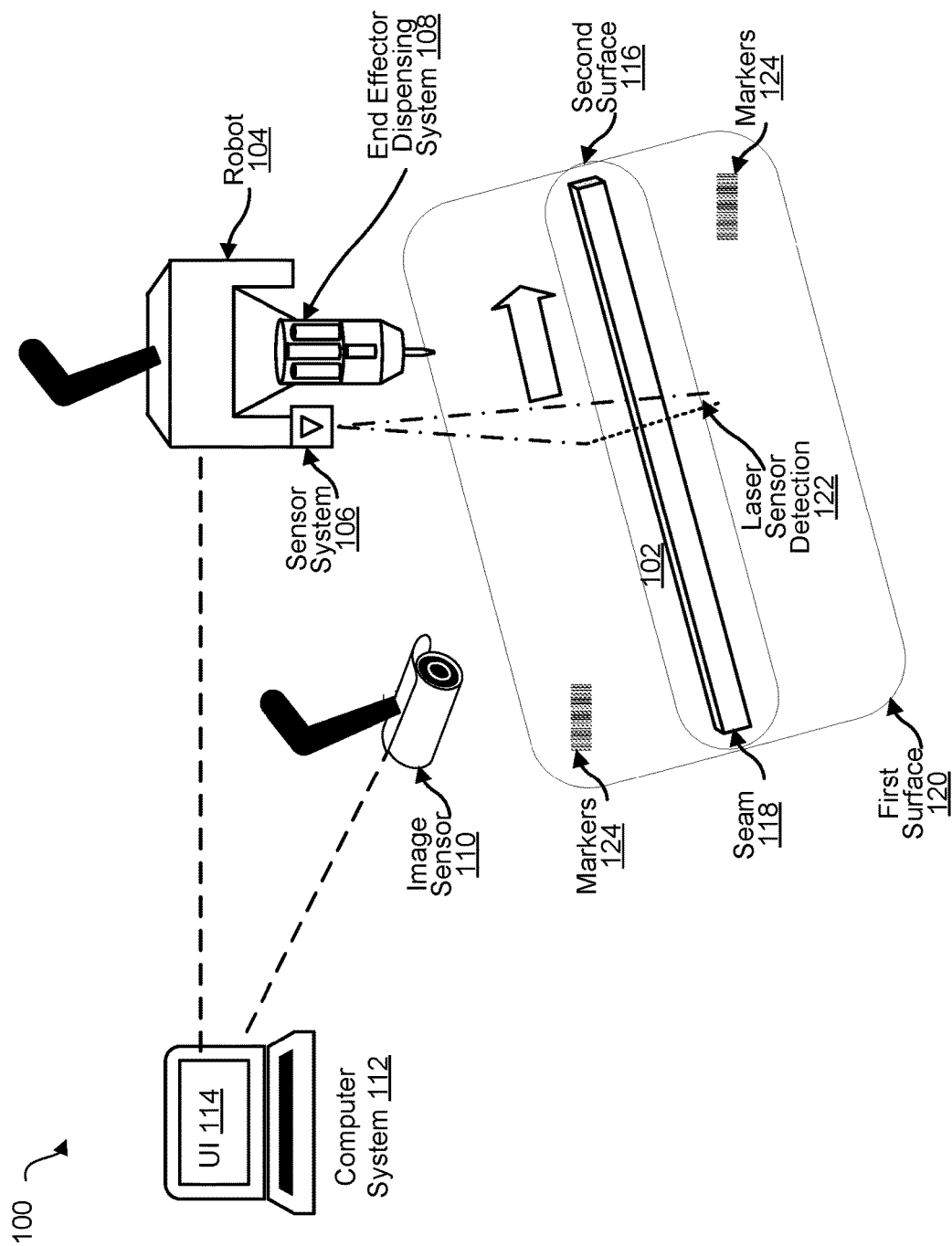
FIG. 1 is an illustration of a robot and computer system generating updates to a trajectory for traversing a surface of a target object, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Robots can be deployed to perform different operations on targets in an operational environment. For example, robots can be deployed in a facility to perform manufacturing and/or maintenance operations on parts or target objects, such as an airplane part. At least some of the operations can be autonomously performed, whereby a robot can move to a surface holding a target object and then perform operations on the target object. Thereafter, the robot can perform error checking or other operations on the target object before moving to another target object or having a target object being brought to the robot. To be able to do so, the robot can register or localize the target object in a coordinate system of the robot. Upon registering the target object in a coordinate system of the robot, the robot can identify the target object using markers or features of the target object and determine a computer aided design (CAD) file for the target object. Among other things, the CAD file for the target object can include a starting position to move the robot to and a trajectory to traverse the target object. Trajectory planning can be performed by using the robot using the coordinate system of the robot and the localization of the target object in the coordinate system of the robot, whereby the robot can position itself or the target object at such an orientation or angle such that the operations can be performed on the target object while avoiding collision and adhering to the trajectory.

Machine manufactured parts, such as airplane wings or fuselage compartments may include differences when compared to their CAD files. For example, slight alterations may be made to the dimensions of portions of machine manufactured parts due to several issues during manufacturing. This can result in errors when relying on CAD files which specify specific dimensions, locations, or structural properties of the machine manufactured parts. For example, suppose a CAD file for an airplane wing designated a channel of the wing at a first set of dimensions. Yet when the airplane wing is manufactured the first set of dimensions actually manufactured for the airplane wing is slightly different. This can result in errors when other processes are performed on the airplane wing which rely on the original specifications for the airplane wing. When dealing with certain machine manufactured parts accuracy is vitally important and processes or operations which are performed on said parts using inaccurate information can lead to delays in production, wasted resources, and inefficient use of time.

Embodiments described herein addressed the above-referenced issues via a system that can determine differences between dimensions or structural properties of a target object as defined in a CAD file or some other measurement and as-is or as detected, using sensor input, dimensions or structural properties of the target object. The differences detected or determined between the properties of target objects can be used to modify previously specified trajectories or generate new trajectories for traversing a target object and performing an operation on said target object. The modified trajectories can result in more accurate operations performed on the target object thereby reducing the likelihood of errors and repeating a process on the target object. A robot with a sensor system may be instructed to move to a starting position of a target object, traverse the target object and obtain sensor input using the sensor system, and compare the sensor input for the target object or a structural property of the target object to the information of a CAD file for the target object (including a trajectory). The comparison between the information of the CAD file and the sensor input can be used to identify or detect differences which can result in modifications to the trajectory specified in the CAD file and eventually used by the robot to traverse the target object and perform an operation on the structural property of the target object.

The embodiments described below are described with reference to performing operations on a target object and a structural property of the target object such as a seam, channel, or gap. It should be appreciated that the functionality described herein can be applied to various applications that involve a robot with an end effector dispensing system that traverses the surface of a target object using a generated trajectory, such as painting, washing, and welding.

FIG. 1 is an illustration of a robot and computer system generating updates to a trajectory for traversing a surface of a target object 102, in accordance with one or more embodiments. FIG. 1 includes a robot 104 that includes a sensor system 106, an end effector dispensing system 108, and image sensor 110. In embodiments, the robot 104 may be in communication with a computer system 112 which includes a user interface 114 for presenting information about the robot 104, the sensor input obtained by the sensor system 106 and image sensor 110, as well as determined differences between a specified trajectory for the target object 102 (represented as second surface 116 and seam 118) and the sensor input. In embodiments, the sensor system 106 may be configured to obtain sensor input (information obtained from the sensors of the sensor system 106) as the robot 104 traverses the target object 102. For example, the sensor system 106 may be a laser sensor system such as a light detection and ranging (LiDAR) sensor system or other sensors configured to detect distance and rotational orientation of the target object 102 by generating point cloud data, for example.

FIG. 1 includes a representation of the robot 104 traversing a first surface 120, holding the target object 102, and using the sensor system 106 to obtain a sensor input represented as the laser sensor detection 122. In embodiments, the trajectory utilized by robot 104 to traverse the second surface 116 and obtain sensor input for seam 118, is specified by a CAD file associated with target object 102. In accordance with at least one embodiment, the computer system 112 may determine the CAD file for the target object based on images captured by the image sensor 110 of the target object 102, the first surface 120, and/or markers (machine readable codes) 124. For example, the computer system 112 may compare the images obtained by image sensor 110 which include a certain configuration and/or location of the markers 124 to compare to known locations and/or configurations of makers in maintained images to determine a type of the target object 102 and an associated CAD file. In embodiments, the computer system 112 may maintain a database that maps configurations and/or locations of markers in images or other representations (e.g., point cloud data, 3D models, 2D models, etc.) to CAD files. The CAD files may specify a type of target object, a starting position for the target object, and a trajectory for the target object that includes a height to maintain the robot 104 at when performing an operation on said target object, as well as a width and depth of a structural property of the target object, such as seam 118.

In some embodiments, the computer system 112 may read or scan the information included in markers 124 to identify the CAD file for the target object 102. The computer system 112 may be configured to compare the information specified in the CAD file for the target object 102 to the information detected or identified by the sensor input from sensor system 106. For example, the depth or width of the seam 118 may be different at certain locations—due to a manufacturer error or other issue during manufacturing of the target object 102. In embodiments, the computer system 112 may be configured to modify or update the trajectory specified in the CAD file for the target object 102 by adjusting the measurements, dimensions, or properties of the trajectory in the CAD file in accordance with the actual measurements, dimensions, or properties for the target object 102, second surface 116, and/or seam 118 as determined from the sensor input of sensor system 106. The computer system 112 thereafter can generate instructions and transmit them to the robot 104 for traversing the second surface 116 of the target object 102 using the updated trajectory and performing an operation on seam 118, such as applying a sealant. The sensor system 106 can continue to obtain sensor input of the target object 102 as the robot 104 uses the end effector dispensing system 108 to apply a sealant to the seam 118 using the updated trajectory. The image sensor 110 can also obtain images of the operation of applying the sealant to the seam 118 by the robot 104 and end effector dispensing system 108 to generate waypoints for manual review by an operator associated with computer system 112. For example, the images of the waypoints of the operation performed on the target object 102 may be presented via UI 114 for manual review.

Figure 2:
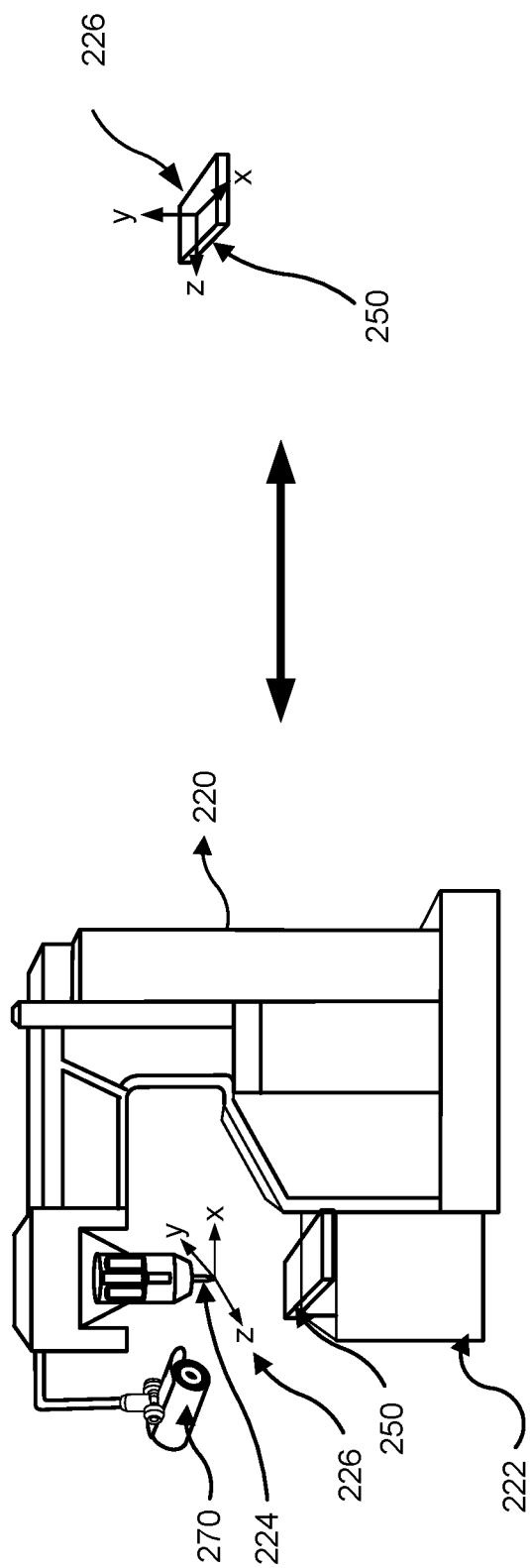
FIG. 2 is an illustration of a robot registering a target object in a local coordinate system, in accordance with one or more embodiments.

FIG. 2 is an illustration of a robot registering a target object in a local coordinate system, in accordance with one or more embodiments. FIG. 2 depicts a robot 220 and target object 250. The robot 220 may be an example of the robot 104 of FIG. 1. FIG. 2 illustrates the results of performing a localization of the target object 250 in the coordinate system of the robot 220 as described herein. The localization or registration of the target object 250 to robot 220 results in the definition (226) of an X, Y, and Z coordinates and rotations along each of the X axis, Y axis, and Z axis of the target object 250 in the local coordinate system of the robot 220. The local coordinate system of the robot 220 may indicate a position of the target object 250 as being placed or otherwise attached to surface 222.

As depicted in FIG. 2, the robot 220 may include sensor systems, such as an image capture sensor 270 and an end effector dispensing system 224. The image capture sensor 270 may be configured to obtain images, video, or other media of the target object 250 and/or surface 222 to aid in registering or localizing the target object 250 in the coordinate system of the robot 220 as well as identifying a particular CAD file for the target object 250. The end effector dispensing system 224 may be configured to perform an operation on target object 250 such as applying a sealant, welding gaps, or other applicable operations. Once the target object 250 is registered or localized in the coordinate system of the robot 220 the robot 220 can utilize the end effector dispensing system 224 to traverse a surface of the target object 250 and perform an operation using the X, Y, and Z coordinates and rotations of the definition (226) for the target object 250. The robot 220 can utilize the definition (226) of the axis and rotations in the coordinate system to rotate the robot 220 and/or the end effector dispensing system 224 relative to the surface of the target object 250 while performing the operation on the target object such as applying the sealant.

The robot 220 may use the definition 226 of the axis and rotations in the coordinate system to adjust the height of the end effector dispensing system 224 as it performs an operation on target object 250. In embodiments, the robot 220 may utilize a trajectory generated by the robot 220 and/or a computer system in communication with the robot 220 to traverse the surface of the target object 250 and perform an operation such as applying a sealant. The trajectory planning may involve inverse and forward kinematics to derive a set of transformations (which may be referred to as an n-frame mode) for controlling the movements of the end effector dispensing system 224 of the robot 220 (including the joints and wrist) such that the end effector dispensing system 224 can follow a trajectory in space to traverse the surface of the target object 250 and perform an operation such as applying a sealant or removing a sealant. In embodiments, the image capture sensor 270 may have a field of view that includes the robot 220, the end effector dispensing system 224 and surface 222. The image capture sensor 270 may generate images that can be processed locally at the robot 220 or remotely at a computer system (not pictured) to determine whether target object 250 is positioned properly on surface 222. If not, an offset can be determined and this offset can be used to further modify a known trajectory for traversing the target object 250 or generate a new trajectory for traversing the target object 250 to perform an operation. In embodiments, the coordinate system of the robot 220 can have an origin, such as the base of the robot 220 or an arm (not specified) where the end effector dispensing system 224 is mounted.

In an example, the end effector dispensing system 224 is operated to move about each of the axes to enable multiple degrees of freedom (DoF) via inverse kinematics, such as to enable six DoF. Inverse kinematics includes a process of computing the variable joint parameters needed to place the end of a kinematic chain (e.g., the end effector dispensing system 224 of the kinematic chain that includes the robot 220 and an arm (not specified) and its components), a given position and orientation relative to the start of the chain (e.g., the origin of the local coordinate system). Forward kinematics involves using kinematic equations to compute the position of the end effector dispensing system 224 from specified values for the joint parameters. Whereas inverse kinematics takes as input the Cartesian end effector position and orientation (e.g., as defined in the local coordinate system of the robot 220) and calculates joint angles, forward kinematics (for the arm and end effector dispensing system 224) takes as input joint angles and calculates the Cartesian position and orientation of the end effector dispensing system 224. Through inverse and forward kinematics, the robot 220 can determine a configuration of its base, arm components, and end effector dispensing system 224 to effectuate the desired pose of the end effector dispensing system 224. The robot 220 can apply various approaches for inverse and forward kinematics, such as a closed-form solution approach or an optimization approach. Once the robot 220 determines the desired position for each of the above-referenced components, the robot 220 can determine a motion for each of the components to reach the desired position. The end effector dispensing system 224 can be actuated to move about each of their axes to enable multiple DoF, and multiple configurations can lead to the desired pose, a phenomenon known as kinematic redundancy. Therefore, the robot 220 can apply an optimization technique to calculate an optimal motion for each component to reach the desired position.

The robot 220 can further identify one or more continuous trajectories that are collision free. The robot 220 can employ various techniques to avoid collisions with obstacles and/or targets by optimizing certain criteria. The robot 220 can simulate candidate trajectories and based on the localization determine whether any component will collide with an obstacle (e.g., the robot 220, the surface 222, any other parts or components of the robot 220 such as arms, cables, etc.) and/or a target (e.g., the target object 250). If a candidate trajectory will result in a collision, the robot 220 can move on to a next candidate trajectory until it identifies a trajectory without a collision. The robot 220 can further store collision data based on past collisions or past calculations. The robot 220 can further eliminate candidate trajectories based on the stored collision data. For example, the robot 220 can compare candidate trajectories to collision data to determine whether a collision is likely. If a collision has a probability less than the threshold probability, the candidate trajectory can be eliminated. If, however, a collision has a probability greater than a threshold probability, the candidate trajectory is not eliminated.

Figure 3:
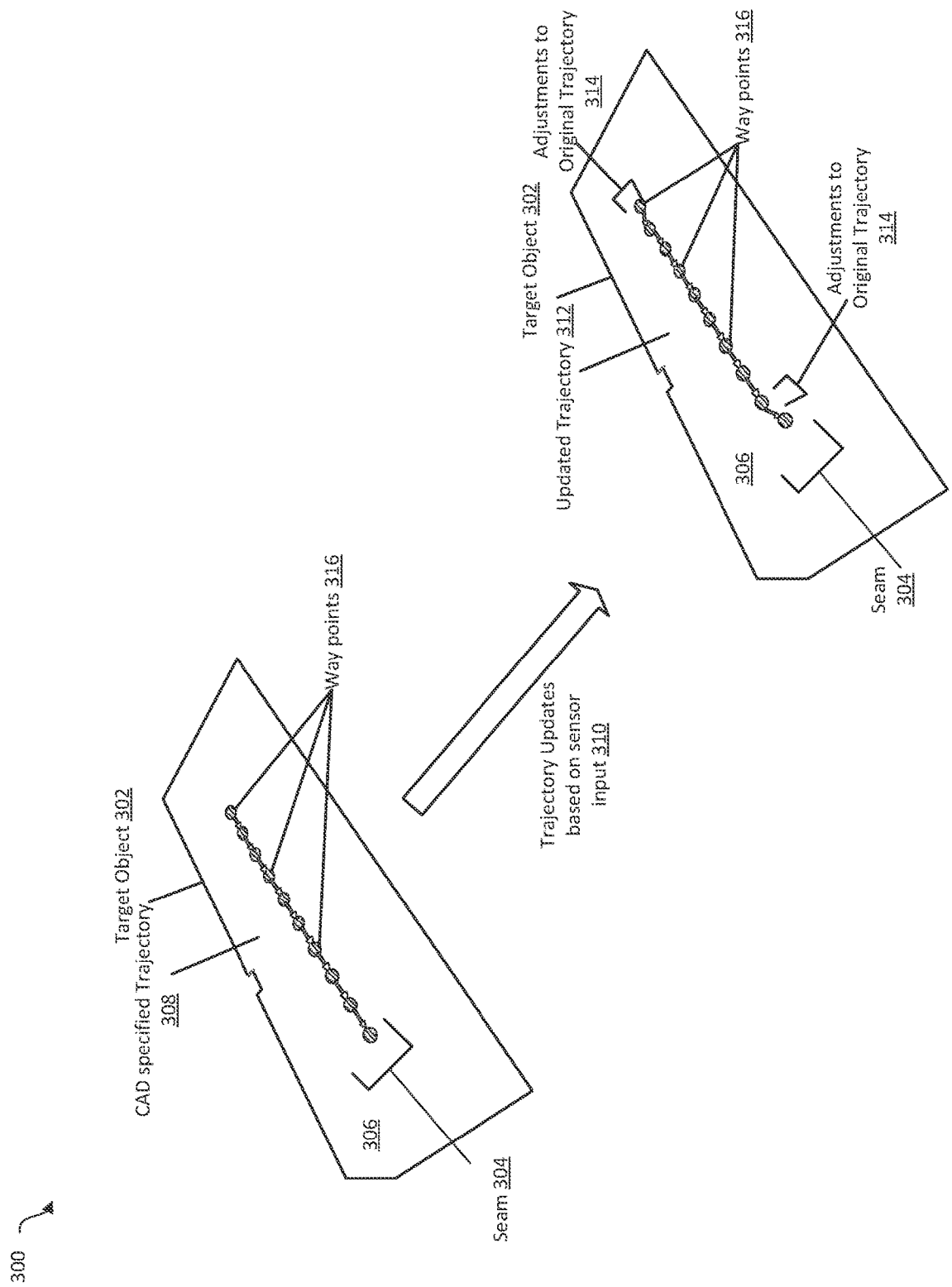
FIG. 3 is an illustration of a target object with a computer aided design (CAD) trajectory being updated to generate an updated trajectory for traversing a seam of the target object, in accordance with one or more embodiments.

FIG. 3 is an illustration of a target object with a computer aided design (CAD) trajectory being updated to generate an updated trajectory for traversing a seam of the target object, in accordance with one or more embodiments. FIG. 3 depicts a target object 302 that includes a seam 304 and a surface 306 of the target object 302. The target object 302 may represent a portion of an airplane wing or a fuselage. The seam 304 may be a channel or gap which requires an operation to be performed on it such as applying a sealant or welding the material near the seam 304 together. In embodiments, the surface 306 of the target object 302 may be curved, elliptical, or concave, such that the seam 304 does not conform to a standard straight trajectory. As described herein, a robot and associated sensor system, may obtain sensor input for the target object 302 and seam 304 to identify changes or modifications between an expected trajectory (e.g., CAD specified trajectory 308) and the actual trajectory detected based on the sensor input upon scanning the target object 302 and seam 304.

For example, target object 302 may be associated with a CAD file that was used when manufacturing the target object 302 and seam 304. However, slight modifications or alterations can occur during manufacturing that can result in slight alterations between a trajectory, as defined in the CAD file, for traversing the seam 304 which could result in incorrect operations being performed on the seam 304 by a robot. As described herein, the sensor system of the robot may be configured to obtain sensor input which can be used to determine differences between the CAD specified trajectory 308 and the actual trajectory as determined by the sensor input. For example, modifications can occur in the location (X, Y, or Z axis location) of the seam 304 in surface 306, and the width or the depth of the seam 304 during manufacture.

As illustrated in FIG. 3, a computer system may update or modify (310) the CAD specified trajectory to generate an updated trajectory 312. FIG. 3 depicts the same surface 306, seam 304, and target object 302 but with a representation of the updated trajectory 312 which includes adjustments to the original trajectory 314. It should be noted that the adjustments to the original trajectory 314 (e.g., the CAD specified trajectory 308) are visible via FIG. 3, the changes detected between the CAD specified trajectory 308 and the updated trajectory 312 may be in the range of nanometers. The adjustments to the original trajectory 314 of FIG. 3 are exaggerated for clarity. In embodiments, the updated trajectory 312 may be used by the robot and end effector dispensing system to more accurately perform an operation on target object 302 and seam 304. FIG. 3 also depicts one or more way points 316 which may represent markers for obtaining image data (images or video) using image capturing sensors of the robot as the robot traverses the seam 304, surface 306, and target object 302 using the CAD specified trajectory 308 or the updated trajectory 312. The images or video of the way points 316 may be provided to a computer system for manual review of the seam 304 prior to and after an operation, such as applying a sealant to the seam 304. Indication of an error based on the manual review of the images or video of the way points 316 after performing an operation can result in further operations to correct any specified errors or mistakes during a previous operation. For example, the robot may be instructed to utilize a sealant wiping tool or some other removal tool to remove a recently applied sealant, traverse the surface 306 of the target object 302, receive updated sensor input, further update the updated trajectory 312, and traverse the seam 304 using the further updated trajectory 312 to reapply the sealant to seam 304—thereby removing the previous detected errors. Way points 316 may be generated and recorded again during each operation to ensure accuracy of the operations performed.

Figure 4:
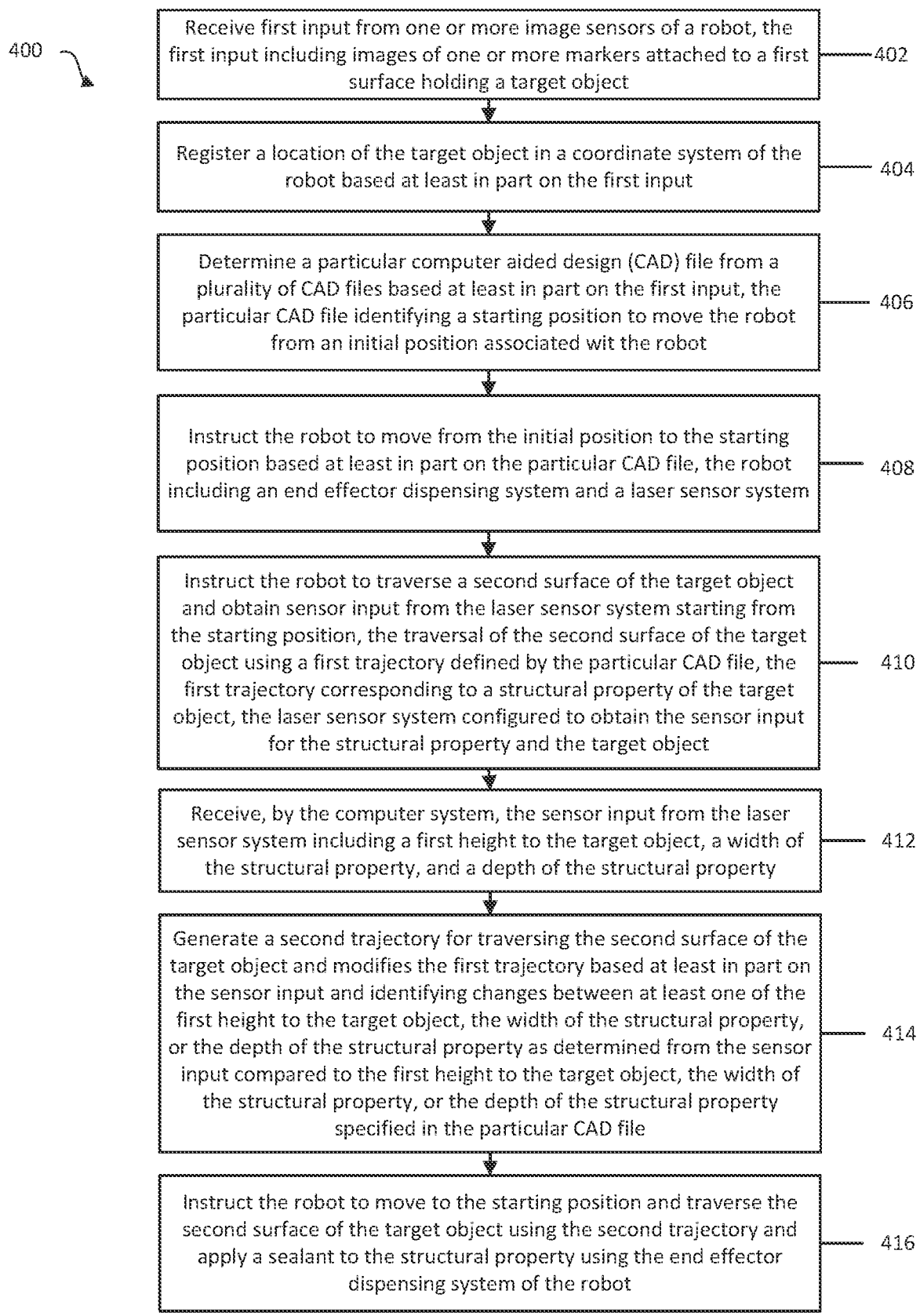
FIG. 4 is a flow for updating trajectories and applying a sealant to a seam of a target object, in accordance with one or more embodiments.

FIG. 4 is a flow for updating trajectories and applying a sealant to a seam of a target object, in accordance with one or more embodiments. At 402, a computer system may receive first input from one or more image sensors of a robot. The first input may include images of one or more markers attached to a first surface holding a target object. For example, the one or more markers may correspond to machine readable codes such as QR codes or bar codes. The one or more image sensors may include a camera(s) or other image capturing devices capable of obtaining images within detection range of the image sensors of a surface, target object, and/or structural property of the target object.

At 404, the computer system may register a location of the target object in a coordinate system of the robot based at least in part on the first input. For example, the computer system can utilize a known location of the robot as well as images of the target object to localize the target object in the coordinate system of the robot.

At 406, the computer system may determine a particular computer aided design (CAD) file from a plurality of CAD files based at least in part on the first input. The particular CAD file may identify a starting position to move the robot from the initial position associated with the robot (e.g., a current position of the robot). In embodiments, the computer system may use object detection algorithms or machine learning algorithms to compare the images of the first surface and/or target object to known images of first surfaces and/or target objects to identify a match between the images. Each known image may be associated with a CAD file from the plurality of CAD files and specify information for the target object such as a depth and width of a seam (structural property) of the target object, curvatures or rotation of the target object on the first surface, a starting position to move the robot to for traversing a trajectory, as well as the trajectory for traversing the structural property of the target object, etc.

At 408, the computer system may instruct the robot to move to the starting position based on the particular CAD file. In embodiments, the robot may include a laser sensor system and an end effector dispensing system. The laser sensor system may include a LiDAR sensor system or other sensors configured to detect distance and rotational orientation of an object by generating point cloud data, for example. The end effector dispensing system may be configured to dispense a substance or otherwise perform an action to a structural property of a target object such as welding two separate objects with a gap in between them together.

At 410, the computer system may instruct the robot to traverse a second surface of the target object and obtain sensor input from the laser sensor system starting from the starting position. As the robot traverses the second surface of the target object the laser sensor system obtains the sensor input from the target object as well as the structural property (e.g., seam). The robot may use the first trajectory to traverse the target object and structural property as specified in the particular CAD file. For example, the first trajectory may include locations to move the robot and laser sensory system as it traverses the target object and structural property to obtain the sensor input.

At 412, the computer system may receive the sensor input from the laser sensor system that includes at least a height from the robot and/or laser sensor system to the target object, a width of the structural property, and a depth of the structural property. In embodiments, the sensor input is obtained in real time as the robot traverses the target object and structural property of the target object.

At 414, the computer system generates a second trajectory for traversing the second surface of the target object and modifies the first trajectory based at least in part on the sensor input and identifying changes between at least one of the following: the first height to the target object, the width of the structural property, and/or the depth of the structural property as determined from the sensor input, compared to the first height to the target object, the width of the structural property, and/or the depth of the structural property specified in the particular CAD file. For example, the comparison may identify a difference between the width of a channel or seam at a particular location in the target object between what is specified in the CAD file for the width at that particular location and what is actually detected from the sensor input upon scanning the seam at the particular location by the robot. The differences detected between distances, depths, widths, etc., between what is specified in a CAD file and what is actually detected by sensors of the robot may be small such as in the range of nanometers. However, this difference can be critical when dealing with certain machine parts or components which correspond to the target object such as airplane parts, submarine parts, etc.

At 416, the computer system may instruct the robot to move to the starting position, again, and traverse the second surface of the target object using the second trajectory and apply a sealing to the structural property using the end effector dispensing system of the robot. For example, in the case where the structural property corresponds to a seam in a machine part, the seam may be filled with a sealant to seal the machine part. In cases where the structural property corresponds to a gap between two objects, the end effector dispensing system may comprise a welding mechanism that welds the two objects together. In embodiments, the laser sensor system may include a light detection and ranging (LiDAR) sensors that are configured to generate point cloud data for the target object and/or the structural property of the target object. The robot may include a sealing wiping tool that is configured to wipe away or remove excess sealant or other materials after the sealant or other material has been applied to the structural property or seam of the target object.

Figure 5:
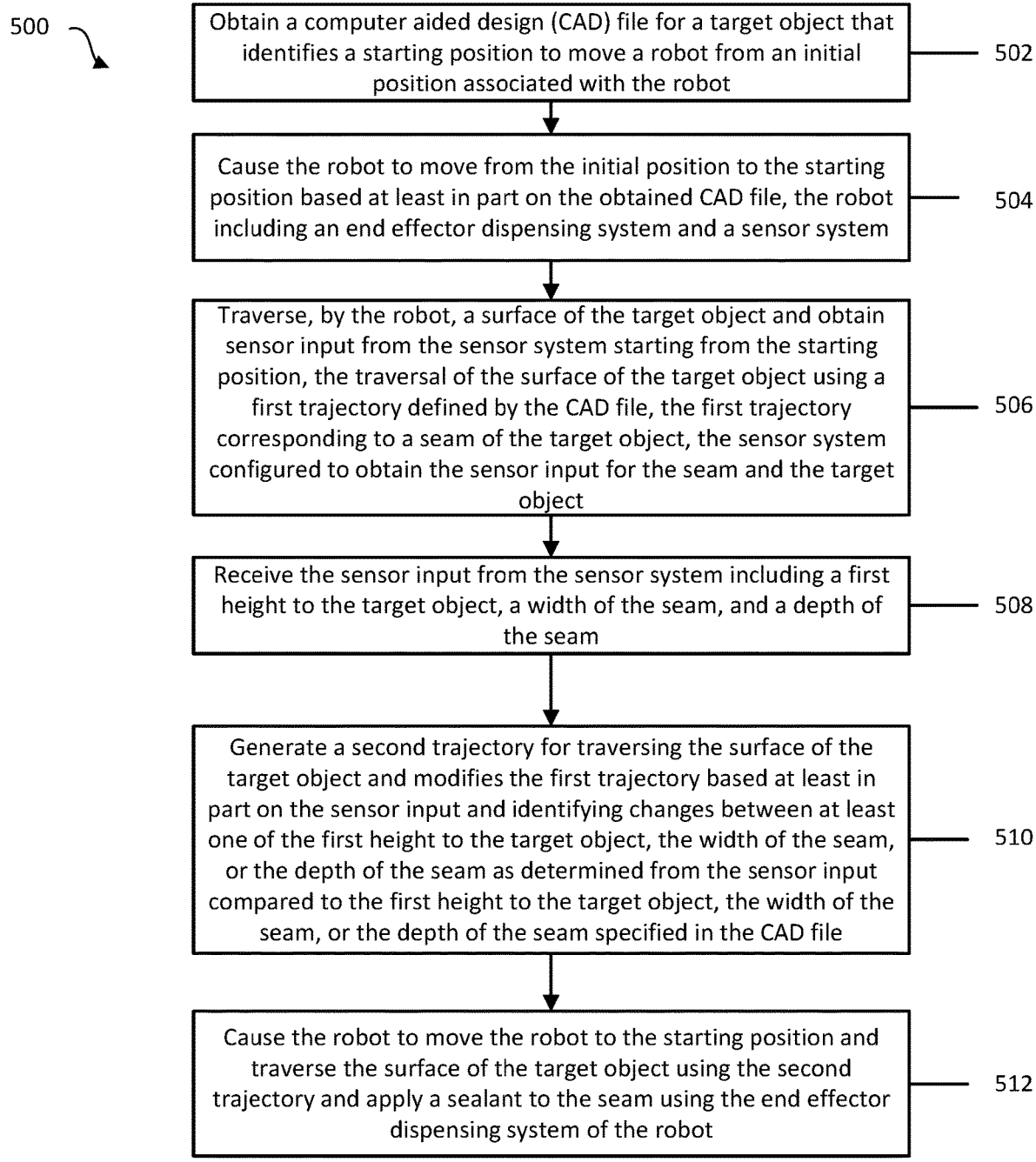
FIG. 5 is a flow for updating trajectories and applying a sealant to a seam of a target object, in accordance with one or more embodiments.

FIG. 5 is a flow for updating trajectories and applying a sealant to a seam of a target object, in accordance with one or more embodiments. At 502, a robot may obtain a CAD file for a target object that identifies a starting position to move a robot from an initial position associated with the robot.

At 504, the robot may move from the initial position to the starting position based at least in part on the obtained CAD file. The robot may include an end effector dispensing system and a sensor system.

At 506, the robot may traverse a surface of the target object and obtain sensor input from the sensor system starting from the starting position. The traversal of the surface of the target object may use a first trajectory that is specified or defined by the CAD file. The first trajectory may include instructions and locations to move the robot as it traverses the target object and correspond to a traversal path for a seam or structural property of the target object. In embodiments, the sensor system may be configured to obtain the sensor input for the seam and/or the target object.

At 508, the robot may receive the sensor input from the sensor system that includes at least the first height to the target object, a width of the seam, and a depth of the seam. In embodiments, the first height to the target object may be compared to a height specified in the CAD file for the target object. The first height may define a height with which the robot must remain positioned from the target object to avoid collisions as well as to complete an operation with the target object, such as applying sealant, given known measurements or dimensions of the robot and the end effector dispensing system of the robot.

At 510, the robot may generate a second trajectory for traversing the surface of the target object that modifies the first trajectory based at least in part on the sensor input and identifying changes between at least one of the first height to the target object, the width of the seam, or the depth of the seam as determined from the sensor input compared to the first height to the target object, the width of the seam, or the depth of the seam specified in the CAD file. The robot can determine differences between dimensions and measurements of the target object and seam as defined by the CAD file and what the actual dimensions and measurements of the target object and seam are from the sensor input. Differences can occur between when CAD files are generated and when target objects are manufactured. The comparison feature of the present disclosure can identify these differences and generate a new trajectory for performing an operation upon the target object and seam that is more accurate given the differences that can occur during manufacture of the target object and/or seam.

At 512, the robot may move to the starting position and traverse the surface of the target object using the second trajectory and apply a sealant to the seam using the end effector dispensing system of the robot. In embodiments, the robot may include one or more image sensors that are configured to obtain images and/or video of the target object and/or seam. The robot may move to the starting position, after applying the sealant, and obtain images or first input of the sealant applied to the seam. The first input or images may be transmitted to another computer system for manual review and identification of any errors during the application operation. If any mistakes are found an indication or message may be transmitted, from the other computer system, which identifies a mistake or error during application of the sealant. In response to receiving such an indication or message the robot may move to the starting position and traverse the surface of the target object and use a sealing wiping tool to remove the sealant from the seam using the second trajectory. Another pass of the surface of the target object and seam may be performed where the sensor system may obtain updated sensor input which is used to generate a third trajectory. The robot may use the third trajectory to traverse the surface of the target object and reapply the sealant to the seam.

Figure 6:
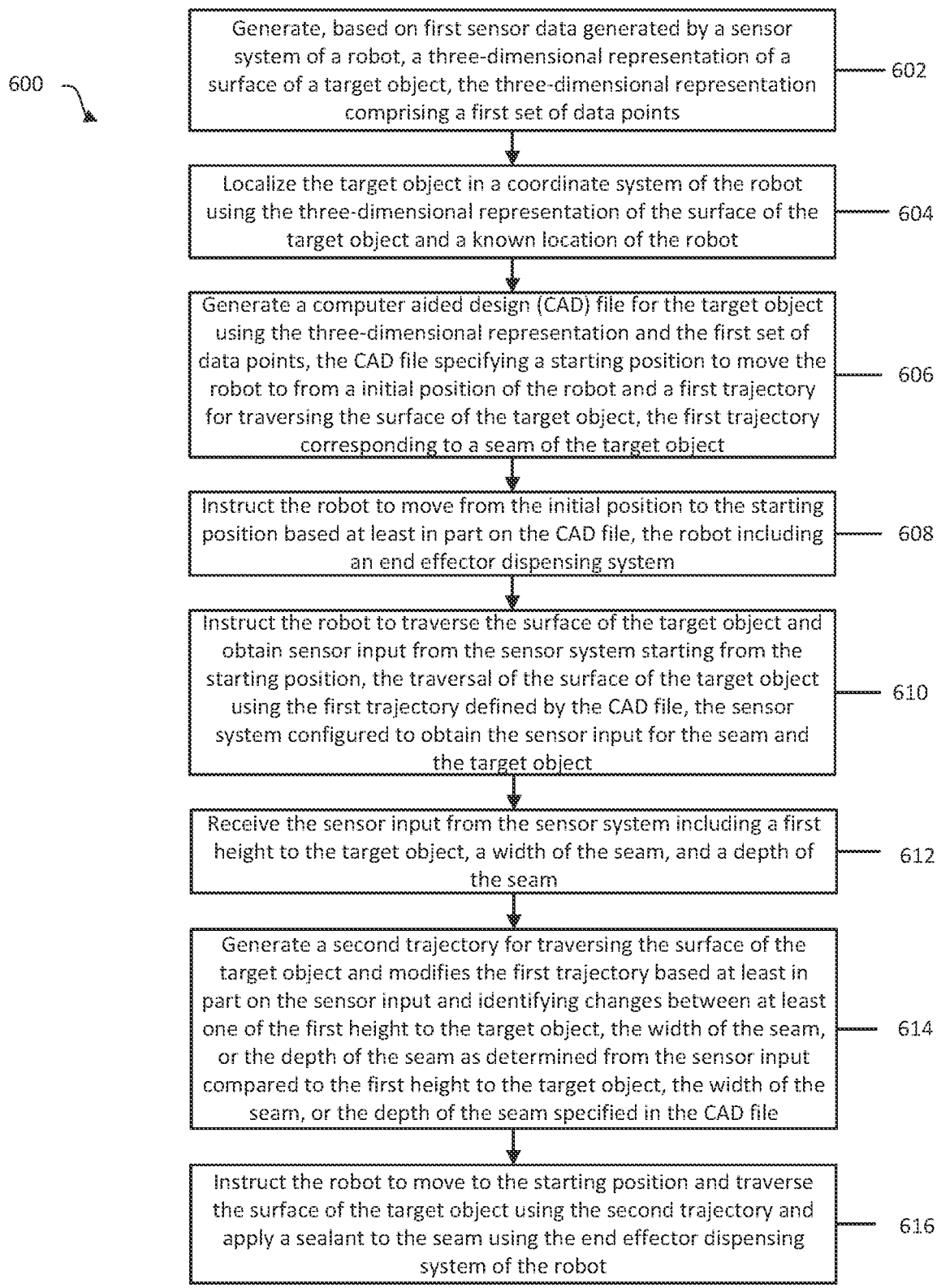
FIG. 6 is a flow for updating trajectories and applying a sealant to a seam of a target object, in accordance with one or more embodiments.

FIG. 6 is a flow for updating trajectories and applying a sealant to a seam of a target object, in accordance with one or more embodiments. At 602, a computer system may generate, based on first sensor data generated by a sensor system of a robot, a three-dimensional (3D) of a surface of a target object, the 3D representation comprising a first set of data points. For example, the sensor system may include a LiDAR sensor system that is configured to generate point cloud data that represents a target object. The point cloud data can be segmented to associate point cloud data points to different objects in the point cloud data. The computer system can extract features from the segmented objects to identify a target object, such as an aircraft panel. In embodiments, the computer system may be configured to associate point cloud data to a target object and computing a normal to and/or from the surface of the target object. The computer system can store a three-dimensional representation (e.g., a point cloud or computer-aided design (CAD) file) of a target object for use in comparison to known target objects and known CAD files for the known target objects.

At 604, the computer system may localize the target object in a coordinate system of the robot using the 3D representation of the surface of the target object and a known initial location of the robot. For example, the sensor system of the robot may be configured to collect measurement data to render a representation of a target object and determine the position of the robot relative to the target object. The sensor system may include thermal sensors, image-capturing devices, and spectral sensors. In some embodiments, the sensor system may be configured to transmit signals toward the target object and collect reflected signals from the target object. The sensor system can be a LiDAR sensor system to emit a pulsed laser towards the target object. The LiDAR sensors can further be configured to collect reflected signals from the target object. The LiDAR sensors can determine an angle of reflection of the reflected signal and a time elapse (time-of-flight) between transmitting the signal and receiving a reflected signal to determine a position of a reflection point on the surface of the target object relative to the LiDAR sensors of the robot. The robot and sensor system can continuously emit laser pulses and collect reflection signals. The computer system can use the signals and data collected from the sensor system to further generate a point cloud of the target object based on the collected reflection signals. In other embodiments, the sensor system can include laser-based sensors, magnetic sensors, or other appropriate sensors.

The computer system can implement one or more localization techniques to determine a position of the target object relative to a position of the robot. In other words, the computer system can determine six degrees of freedom data of the target object in the coordinate system (e.g., reference system) of the robot. For example, the six degrees of freedom data can include the x-axis, y-axis, and z-axis coordinates, and rotational data around each axis.

In some embodiments, one localization technique can include the computer system accessing a point cloud for the target object. For example, if the target object is a wing of an F-15 Eagle fighter jet, the predefined point cloud is of a reference wing of an F-15 Eagle fighter jet. The computer system can retrieve a predefined point cloud of a target object from a repository based on the specifications of the target object. In some instances, an operator can load the predefined point cloud onto the computer system prior to the robot approaching the target object or upon arriving at the target object. In other instances, the computer system can identify a feature of the target object to identify a predefined point cloud from a repository. For example, the computer system can implement computer vision techniques to identify an identifying feature (e.g., identifier such as a tail number, component, shape) of the target object. The computer system can further use the identifying feature to retrieve a predefined point cloud.

In embodiments, the computer system can compare the data points of the generated point cloud described above and the predefined point cloud to identify the target object. The pre-defined point cloud can be a priori and generated by, for example, a previous scanning of the target object, or via a reference target object. In general, the computer system can identify a pattern of data points of the generated point cloud that are similar to the pattern of data points of the predefined data cloud.

The computer system can, for example, apply an iterative closest point (ICP) technique. The computer system can keep the generated point cloud or the predefined point cloud fixed, while transforming the other point cloud to match the fixed point cloud. The transformation can be based on minimizing a distance between the data points of the fixed point cloud and the data points of the transformed point cloud. Alternatively, the computer system can use a convolutional neural network (CNN) point cloud matching technique or other machine learning algorithm. The computer system can rely upon feature extraction, matching, and outlier rejection. The CNN can receive the generated point cloud and the pre-defined point cloud as inputs. The computer system can extract features from the generated point cloud and the predefined point cloud. Based on the features, the CNN can generate a mapping from the generated point cloud to the predefined point cloud and estimate a rigid transformation. CNN point cloud matching techniques can vary, and it should be appreciated that the computer system is operable to execute each technique as desired.

As the generated point cloud data points include information regarding the relative distance from sensors used to scan the target object for point cloud generation, the computer system can determine the relative position (e.g., x-axis, y-axis, and z-axis coordinates, and rotational data around each axis) of the target object with respect to the coordinate system of the robot. This position data is derived from the above-described process of transforming one point cloud to match the other point cloud.

Another localization technique can be implemented in the event that the computer system can retrieve a predefined computer-assisted design (CAD) model. As described above, the computer system can scan the target object and generate a point cloud. The computer system can further apply a modeling technique to generate a model from the generated point cloud. The computer system can compare the pre-defined CAD model with the model generated by the computer system. Based on identifying a match, the computer system can determine the relative position (e.g., x-axis, y-axis, and z-axis coordinates, and rotational data around each axis) of the target object with respect to the coordinate system of the robot.

The model generated by the computer system can be a polygonal model. The computer system can employ various methods to generate the polygonal model. For instance, combinatorial approaches such as Delaunay triangulation, alpha shapes, and Voronoi diagrams create a triangle-based mesh by interpolating all or most of the points of the point cloud. Other methods directly reconstruct an approximate surface represented in implicit form by defining the implicit function as the sum of radial basis functions (RBFs) centered at the points, known as global fitting methods, or considering subsets of nearby points, known as local fitting methods.

Yet another localization technique that can be implemented by the computer system can include the use of synthetic markers (machine readable codes). The synthetic markers can be fabricated markers having a computer-readable code, such as a QR code or bar-code. The synthetic markers can be affixed to the target object or a surface holding the target object at known points of the target object or the surface holding the target object or having pre-defined distances between them. Each synthetic marker can further be uniquely identified through the computer-readable code. The computer system can use the sensor input from the sensor system from scanning the target object and detect the synthetic markers. The computer system can further transmit a signal from one or more sensors of the sensor system toward the synthetic markers and collect a reflected signal from the synthetic markers. Based on the detection, the computer system can further determine an angle of reflection of a reflected signal from the synthetic markers and a time elapse (time-of-flight) between transmitting a signal and receiving a reflected signal from the synthetic markers to determine a position of the synthetic markers on the surface of the target object relative to the sensors or the surface holding the target object. The computer system can also capture a two-dimensional (2D) image of the synthetic marker and compare the size and location of the image pixels to that of a reference image virtually located at the camera origin to determine a position of the synthetic markers on the surface of the target object relative to the sensors. Based on the determination, the computer system can determine the relative position (e.g., x-axis, y-axis, and z-axis coordinates, and rotational data around each axis) of the target object with respect to the coordinate system of the robot.

Each of the above localization techniques can be used across the whole surface of a target object, over a portion of the surface of the target object, over a surface holding the target object, or a portion of the surface holding the target object. For example, if the target object were an aircraft, the localization techniques could be performed over the entire surface area of the aircraft. In other instances, the computer system can perform the localization techniques over a portion of the aircraft, such as the wing or fuselage.

Additionally, each of the above localization techniques can be performed individually or in combination. Each of the above localization techniques can include one or more elements that can be incorporated into another technique. For example, the computer system can match a generated point cloud and pre-defined point cloud and also employ synthetic markers to assist in localizing the target object with respect to the coordinate system of the robot.

At 606, the computer system may generate a computer aided design (CAD) file for the target object using the three-dimensional representation and the first set of data points, the CAD file specifying a starting position to move the robot to from an initial position of the robot and a first trajectory for traversing the surface of the target object, the first trajectory corresponding to a seam of the target object.

At 608, the computer system can instruct the robot to move from the initial position to the starting position based at least in part on the CAD file, the robot including an end effector dispensing system.

At 610, the computer system can instruct the robot to traverse the surface of the target object and obtain sensor input from the sensor system starting from the starting position, the traversal of the surface of the target object using the first trajectory defined by the CAD file, the sensor system configured to obtain the sensor input for the seam and the target object.

At 612, the computer system can receive the sensor input from the sensor system including a first height to the target object, a width of the seam, and a depth of the seam.

At 614, the computer system can generate a second trajectory for traversing the surface of the target object and modifies the first trajectory based at least in part on the sensor input and identifying changes between at least one of the first height to the target object, the width of the seam, or the depth of the seam as determined from the sensor input compared to the first height to the target object, the width of the seam, or the depth of the seam specified in the CAD file.

At 616, the computer system can instruct the robot to move to the starting position and traverse the surface of the target object using the second trajectory and apply a sealant to the seam using the end effector dispensing system of the robot.

Figure 7:
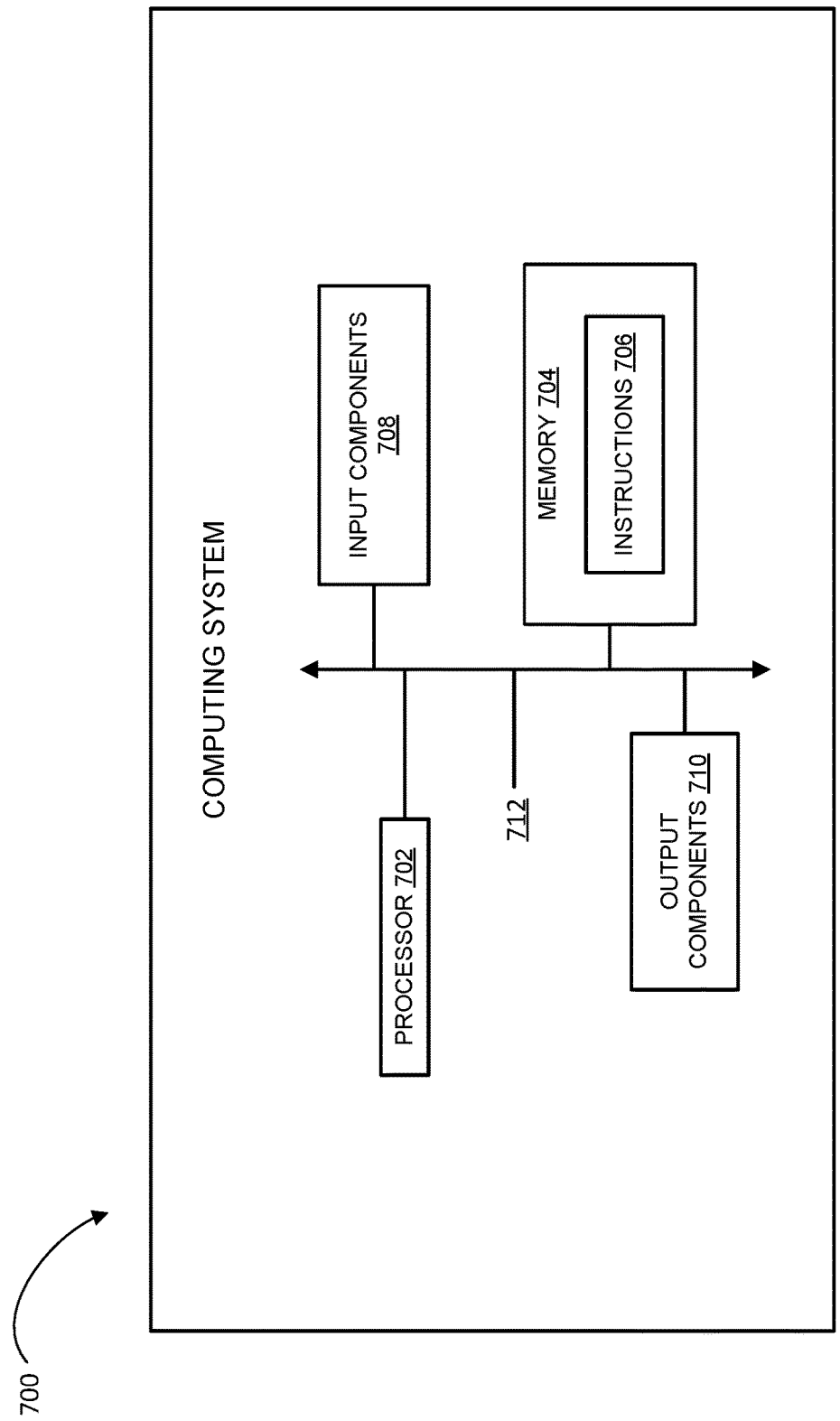
FIG. 7 is a block diagram of an example of a computing device, in accordance with one or more embodiments.

FIG. 7 is a block diagram of an example of a computing device 700 usable for implementing some aspects of the present disclosure. The computing device 700 includes a processor 702 coupled to a memory 704 via a bus 712. The processor 702 can include one processing device or multiple processing devices. Examples of the processor 702 include a Field-Programmable Gate Array (FPGA), an application-specific integrated circuit (ASIC), a microprocessor, or any combination of these. The processor 702 can execute instructions 706 stored in the memory 704 to perform operations. For example, the processor can execute instructions 706 for using a robotic device to identify a seam or structural property of a target object, register the target object in a local coordinate system of the robot, determine adjustments or changes between a CAD specified trajectory for the seam of the target object, traverse the seam of the target object using a CAD specified trajectory or a generated trajectory that uses input from sensors to generate the trajectory that is different from the CAD specified trajectory, and apply sealant or perform other operations to the seam or structural property of the target object. In some examples, the instructions 706 can include processor-specific instructions generated by a compiler or an interpreter from code written in any suitable computer-programming language, such as C, C++, Python, or Java.

The memory 704 can include one memory device or multiple memory devices. The memory 704 may be non-volatile and include any type of memory device that retains stored information when powered off. Examples of the memory 704 can include electrically erasable and programmable read-only memory (EEPROM), flash memory, or any other type of non-volatile memory. At least some of the memory 704 includes a non-transitory computer-readable medium from which the processor 702 can read instructions 706. A computer-readable medium can include electronic, optical, magnetic, or other storage devices capable of providing the processor 702 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 706.

The computing device 700 may also include other input and output (I/O) components. The input component 708 can include a mouse, a keyboard, a trackball, a touch pad, a touch-screen display, or any combination of these. The output component 710 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitations of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    receiving, by a computer system, a first input from one or more image sensors of a robot, the first input including images of one or more markers attached to a first surface holding a target object;
    registering, by the computer system, a location of the target object in a coordinate system of the robot based at least in part on the first input;
    determining, by the computer system, a particular computer aided design (CAD) file from a plurality of CAD files based at least in part on the first input, the particular CAD file identifying a starting position to move the robot from an initial position associated with the robot;
    instructing, by the computer system, the robot to move from the initial position to the starting position based at least in part on the particular CAD file, the robot including an end effector dispensing system and a laser sensor system;
    instructing, by the computer system, the robot to traverse a second surface of the target object and obtain sensor input from the laser sensor system starting from the starting position, the traversal of the second surface of the target object using a first trajectory defined by the particular CAD file, the first trajectory corresponding to a structural property of the target object, the laser sensor system configured to obtain the sensor input for the structural property and the target object;
    receiving, by the computer system, the sensor input from the laser sensor system including a first height to the target object, a width of the structural property, and a depth of the structural property;
    generating, by the computer system, a second trajectory for traversing the second surface of the target object and modifies the first trajectory based at least in part on the sensor input and identifying changes between at least one of the first height to the target object, the width of the structural property, or the depth of the structural property as determined from the sensor input compared to the first height to the target object, the width of the structural property, or the depth of the structural property specified in the particular CAD file; and
    instructing, by the computer system, the robot to move to the starting position and traverse the second surface of the target object using the second trajectory and apply a sealant to the structural property using the end effector dispensing system of the robot.

2. The computer-implemented method of claim 1, wherein the one or more markers include machine readable codes, and wherein the structural property of the target object includes a seam, a gap, or a channel.

3. The computer-implemented method of claim 1, wherein the sensor input from the laser sensor system includes a pitch of the target object relative to the robot.

4. The computer-implemented method of claim 3, wherein generating the second trajectory for traversing the second surface of the target object includes modifying the pitch of the robot while traversing the second surface.

5. The computer-implemented method of claim 1, wherein the laser sensor system includes light detection and ranging (LiDAR) sensors.

6. The computer-implemented method of claim 1, wherein robot further includes a sealant wiping tool.

7. The computer-implemented method of claim 6, further comprising instructing, by the computer system, the robot to use the sealant wiping tool to remove an excess amount of the sealant from the structural property of the target object as the robot applies the sealant to the structural property of the target object using the dispensing system of the robot.

8. The computer-implemented method of claim 1, further comprising receiving, by the computer system, second input from the one or more image sensors of the robot of the sealant applied to the structural property as the robot traverses the second surface of the target object using the second trajectory.

9. The computer-implemented method of claim 8, further comprising transmitting, by the computer system, the second input to another computer for manual review of application of the sealant to the structural property of the target object.

10. The computer-implemented method of claim 8, further comprising:
    generating, by the computer system, one or more way points during application of the sealant to the structural property, the one or more way points including an X location, a Y location, and a Z location within a coordinate system corresponding to the location of the target object and a relative location of the robot; and
    storing, by the computer system, the one or more way points associated with an identifier of the target object.

11. A computer system of a robot comprising:
one or more processors; and
one or more computer-readable media including instructions that, when executed by the one or more processors, cause the one or more processors to perform operations comprising:
obtaining a computer aided design (CAD) file for a target object that identifies a starting position to move the robot from an initial position associated with the robot;
causing the robot to move from the initial position to the starting position based at least in part on the obtained CAD file, the robot including an end effector dispensing system and a sensor system;
causing the robot to traverse a surface of the target object and obtain sensor input from the sensor system starting from the starting position, the traversal of the surface of the target object using a first trajectory defined by the CAD file, the first trajectory corresponding to a seam of the target object, the sensor system configured to obtain the sensor input for the seam and the target object;
receiving the sensor input from the sensor system including a first height to the target object, a width of the seam, and a depth of the seam;
generating a second trajectory for traversing the surface of the target object and modifies the first trajectory based at least in part on the sensor input and identifying changes between at least one of the first height to the target object, the width of the seam, or the depth of the seam as determined from the sensor input compared to the first height to the target object, the width of the seam, or the depth of the seam specified in the CAD file; and
causing the robot to move to the starting position and traverse the surface of the target object using the second trajectory and apply a sealant to the seam using the end effector dispensing system of the robot.

12. The computer system of claim 11, wherein the instructions that, when executed by the one or more processors, further cause the one or more processors to perform operations comprising:
causing moving the robot to the starting position after completing a first traversal of the seam using the second trajectory to apply the sealant to the seam;
causing the robot to traverse the seam using the second trajectory and obtaining, using one or more image sensors of the robot, first input that includes images of the sealant applied to the seam.

13. The computer system of claim 12, wherein the instructions that, when executed by the one or more processors, further cause the one or more processors to perform operations comprising:
transmitting, to another computer system, the first input for manual review of the application of the sealant to the seam; and
receiving, from the another computer system, a response that indicates a mistake during application of the sealant to the seam.

14. The computer system of claim 13, wherein the instructions that, when executed by the one or more processors, further cause the one or more processors to perform operations comprising:
causing the robot to move to the starting position and traversing the surface of the target object using the second trajectory and remove the sealant from the seam using a sealant wiping tool of the robot.

15. The computer system of claim 14, wherein the instructions that, when executed by the one or more processors, further cause the one or more processors to perform operations comprising:
causing the robot to move to the starting position and traverse the surface of the target object to obtain updated sensor input from the sensory system starting from the starting position;
receiving, from the sensory system, the updated sensor input including updates to at least one of the first height to the target object, the width of the seam, or the depth of the seam; and
generating a third trajectory for traversing the surface of the target object and modifying the second trajectory based at least in part on the updated sensor input.

16. The computer system of claim 15, wherein the instructions that, when executed by the one or more processors, further cause the one or more processors to perform operations comprising:
causing the robot to move the robot to the starting position and traversing the surface of the target object using the third trajectory and apply the sealant to the seam using the dispensing system of the robot.

17. One ore more non-transitory computer-readable media including one or more sequences of instructions which, when executed by one or more processors, cause the one or more processors to perform operations comprising:
generating, based on first sensor data generated by a sensor system of a robot, a three-dimensional representation of a surface of a target object, the three-dimensional representation comprising a first set of data points;
localizing the target object in a coordinate system of the robot using the three-dimensional representation of the surface of the target object and an initial position of the robot;
generating a computer aided design (CAD) file for the target object using the three-dimensional representation and the first set of data points, the CAD file specifying the initial position to move the robot to from the initial position of the robot and a first trajectory for traversing the surface of the target object, the first trajectory corresponding to a seam of the target object;
instructing the robot to move from the initial position to the starting position based at least in part on the CAD file, the robot including an end effector dispensing system;
instructing the robot to traverse the surface of the target object and obtain sensor input from the sensor system starting from the starting position, the traversal of the surface of the target object using the first trajectory defined by the CAD file, the sensor system configured to obtain the sensor input for the seam and the target object;
receiving the sensor input from the sensor system including a first height to the target object, a width of the seam, and a depth of the seam;
generating a second trajectory for traversing the surface of the target object and modifies the first trajectory based at least in part on the sensor input and identifying changes between at least one of the first height to the target object, the width of the seam, or the depth of the seam as determined from the sensor input compared to the first height to the target object, the width of the seam, or the depth of the seam specified in the CAD file; and instructing the robot to move to the starting position and traverse the surface of the target object using the second trajectory and apply a sealant to the seam using the end effector dispensing system of the robot.

18. One or more non-transitory computer-readable media of claim 17, wherein generating the CAD file includes comparing the three-dimensional representation of the surface of the target object to a plurality of three-dimensional representations of surfaces of known target objects to identify the target object.

19. One or more non-transitory computer-readable media of claim 18, wherein comparing the three-dimensional representation of the surface of the target object to the plurality of three-dimensional representations of the surfaces of the known target objects includes using a machine learning algorithm trained using the plurality of three-dimensional representations of the surfaces of the known target objects.

20. One or more non-transitory computer-readable media of claim 17, wherein the instructions that, when executed by the one or more processors, further cause the one or more processors to perform operations comprising:

implementing an object detection algorithm that uses the three-dimensional representation of the surface of the target object to identify the target object, and wherein generating the CAD file includes using the identification of the target object.

* * * * *